United States Patent
Yamada et al.

(10) Patent No.: US 7,995,876 B2
(45) Date of Patent: Aug. 9, 2011

(54) ARRAYED WAVEGUIDE GRATING CIRCUIT

(75) Inventors: Tomoyuki Yamada, Tokyo (JP);
Mitsuru Nagano, Tokyo (JP); Mikitaka Ito, Tokyo (JP); Toshio Watanabe, Makuhari (JP); Takayuki Mizuno, Atsugi (JP); Takashi Goh, Atsugi (JP); Akimasa Kaneko, Atsugi (JP)

(73) Assignees: Nippon Telegraph and Telephone Corporation, Tokyo (JP); NTT Electronics Corporation, Tokyo (JP)

( * ) Notice: Subject to any disclaimer, the term of this patent is extended or adjusted under 35 U.S.C. 154(b) by 393 days.

(21) Appl. No.: 12/158,485

(22) PCT Filed: Dec. 21, 2006

(86) PCT No.: PCT/JP2006/325528
§ 371 (c)(1),
(2), (4) Date: Jun. 20, 2008

(87) PCT Pub. No.: WO2007/072920
PCT Pub. Date: Jun. 28, 2007

(65) Prior Publication Data
US 2009/0263084 A1 Oct. 22, 2009

(30) Foreign Application Priority Data
Dec. 21, 2005 (JP) .................................. 2005-368871

(51) Int. Cl.
*G02B 6/12* (2006.01)
(52) U.S. Cl. ......................................................... 385/14
(58) Field of Classification Search ..................... 385/14
See application file for complete search history.

(56) References Cited

U.S. PATENT DOCUMENTS

| 6,434,292 | B1 | 8/2002 | Kim et al. | |
|---|---|---|---|---|
| 2003/0007728 | A1* | 1/2003 | Uetsuka et al. | 385/37 |
| 2003/0095737 | A1* | 5/2003 | Welch et al. | 385/14 |
| 2007/0086702 | A1* | 4/2007 | Peters et al. | 385/37 |

FOREIGN PATENT DOCUMENTS

| JP | 2001-166162 | 6/2001 |
|---|---|---|
| JP | 3441437 B2 | 9/2003 |

OTHER PUBLICATIONS

International Preliminary Report on Patentability date Jul. 3, 2008 for the related PCT Application No. PCT/JP2006/325528 (translated English copy).

* cited by examiner

*Primary Examiner* — Uyen Chau N Le
*Assistant Examiner* — Hoang Tran
(74) *Attorney, Agent, or Firm* — Workman Nydegger

(57) ABSTRACT

Two AWG circuits are integrated while preventing degradation in quality of a multiplexing/demultiplexing function. An arrayed waveguide grating circuit includes: a first slab waveguide (52) connected to a first input waveguide (51*a*) and second output waveguides (55*b*); a second slab waveguide (54) connected to first output waveguides (55*a*) and a second input waveguide (51*b*); and an array waveguide (53) connecting the first slab waveguide (52) and the second slab waveguide (54), wherein the input waveguides (51*a*, 51*b*) are connected to the slab waveguides (52, 54) at an interval of 1.5× from the outermost second output waveguide out of the second output waveguides (55*a*, 55*b*) connected at an interval x depending on a wavelength.

12 Claims, 8 Drawing Sheets

US 7,995,876 B2

ARRAYED WAVEGUIDE GRATING CIRCUIT

TECHNICAL FIELD

The present invention relates to an arrayed waveguide grating circuit used as an optical multiplexer/demultiplexer.

BACKGROUND ART

In recent years, with the diffusion of an optical fiber transmission system, techniques for integrating a great number of optical devices with a high density have been required. Planar Lightwave Circuit (PLC) has been known as one of such techniques. The PLC is an optical circuit obtained by integrating optical waveguides and waveguide-type optical devices on a silicon substrate or a quartz substrate. The PLC has high productivity and reliability and is superior in the integration and functionarity. A wavelength division multiplex transmission method has been used as a method to realize an optical fiber transmission system having a high capacity. A demultiplexer and a multiplexer are used as an optical circuit to demultiplex and multiplex a plurality of optical signal having different wavelengths in a transmitter/receiver based on the wavelength division multiplex transmission method. The PLC typically includes therein a multiplexer/demultiplexer of an arrayed waveguide grating (hereinafter called Arrayed Waveguide Grating (AWG)) circuit.

FIG. 1 illustrates the structure of a conventional AWG circuit. The AWG circuit 10 is composed of: the first slab waveguide 12 connected to input waveguides 11; the second slab waveguide 14 connected to output waveguides 15; and an array waveguide 13 connecting the first slab waveguide 12 to the second slab waveguide 14. The array waveguide 13 is structured so that neighboring waveguides are arranged with a fixed difference in the light path length. The wavelength division multiplex transmission method requires about 100 array waveguides 13 in order to handle an optical signal of 32 waves for example.

Since the above-described AWG circuit 10 requires the 100 array waveguides 13 having a fixed difference in the light path length, the AWG circuit occupies a larger area in the PLC substrate when compared with other waveguide-type optical devices. To solve this, various approaches have been made in order to reduce the size of the circuit. FIG. 2 illustrates a multiplexer/demultiplexer using the conventional AWG circuit. The first slab waveguides 22a and 22b and the second slab waveguides 24a and 24b are superposed at the same portions to allow the AWG circuit 20a used as a demultiplexer and the AWG circuit 20b used as a multiplexer to be mounted on a single PLC substrate. However, the array waveguides 23a and 23b of two groups had a disadvantage that a manufacturing error for example causes a deviated center wavelength.

Another approach is that one input waveguide used for a demultiplexer and output waveguides used for a multiplexer are connected to the first slab waveguide and output waveguides used for a demultiplexer and one input waveguide used for a multiplexer are connected to the second slab waveguide to share an array waveguide (see Patent Publication 1 for example). FIG. 3 shows the structure of the conventional AWG circuit sharing the array waveguide. The AWG circuit 30 is composed of: the first slab waveguide 32 connected to an input waveguide 31a and output waveguides 35b; the second slab waveguide 34 connected to output waveguides 35a and an input waveguide 31b; and an array waveguide 33 connecting the first slab waveguide 32 to the second slab waveguide 34. This approach requires the input waveguide to be provided at the position to which light from the array waveguides to the slab waveguides focuses (i.e., the center of a plurality of output waveguides).

FIG. 4 shows the conventional relation according to which the input/output waveguide is connected to the slab waveguide. Generally, the portion at which the input/output waveguide is connected to the slab waveguide is structured so that the input waveguide has a parabolic connecting section and the output waveguide 35 has a tapered connecting section 37 in order to allow the transmission bandwidth to have an increased spectrum. However, the conventional AWG circuit does not install the parabolic connecting section and the tapered connecting section because of arranging the input waveguides among the output waveguide arranged with a predetermined interval x depending on a wavelength interval using. Thus, a disadvantage has been caused where the connecting section connecting the input/output waveguide to the slab waveguide has a transmission bandwidth having a narrow spectrum. When the parabolic connecting section and the tapered connecting section are arranged while being superposed to each other, crosstalk is caused between the input waveguide and the neighboring output waveguide. Furthermore, the removal of the input waveguide and the neighboring output waveguide also causes a lack of a channel to which a series of wavelengths are allocated, which is impractical for the operation.

It is an objective of the present invention to provide an arrayed waveguide grating circuit in which two AWG circuits are integrated while preventing the multiplexing/demultiplexing function from having a deteriorated quality.

Patent Publication 1: Japanese Patent No. 3441437

In order to achieve the objective as described above, the arrayed waveguide grating circuit according to an embodiment of the present invention includes: a first slab waveguide connected to a first input waveguide and second output waveguides at one face; a second slab waveguide connected to first output waveguides and a second input waveguide at one face; and an array waveguide that connects the other face opposed to the one face of the first slab waveguide to the other face opposed to the one face of the second slab waveguide. The first input waveguide is connected to the first slab waveguide and is positioned outside of the second output waveguides with a second interval to an outermost output waveguide among the second output waveguides connected to the one face of the first slab waveguide with a first interval depending on a wavelength. The second input waveguide is connected to the second slab waveguide and is positioned outside of the first output waveguides with a second interval to an outermost output waveguide among the first output waveguides connected to the one face of the second slab waveguide with a first interval depending on a wavelength.

The second interval can be an interval obtained by adding a half of the first interval to a positive integer of the first interval. The second interval also can be an interval 1.5 times higher than the first interval.

BEST MODE FOR CARRYING OUT THE INVENTION

Figure 1:
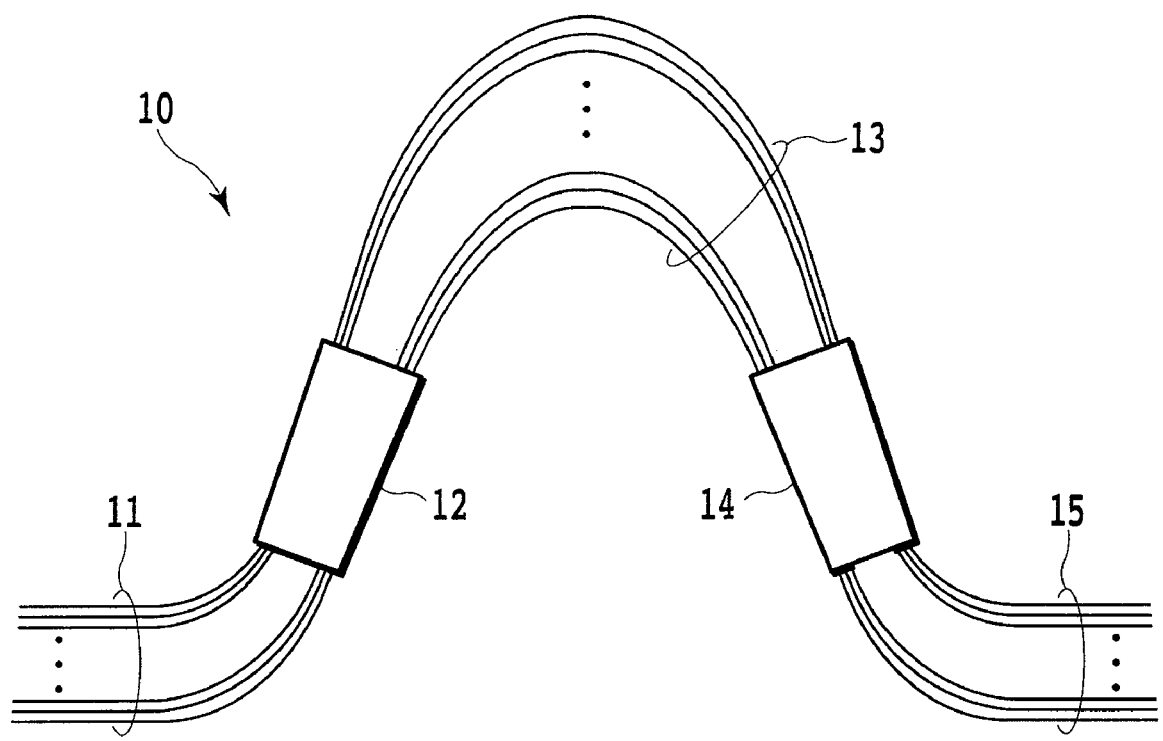
FIG. 1 illustrates the structure of a conventional AWG circuit.
Figure 2:
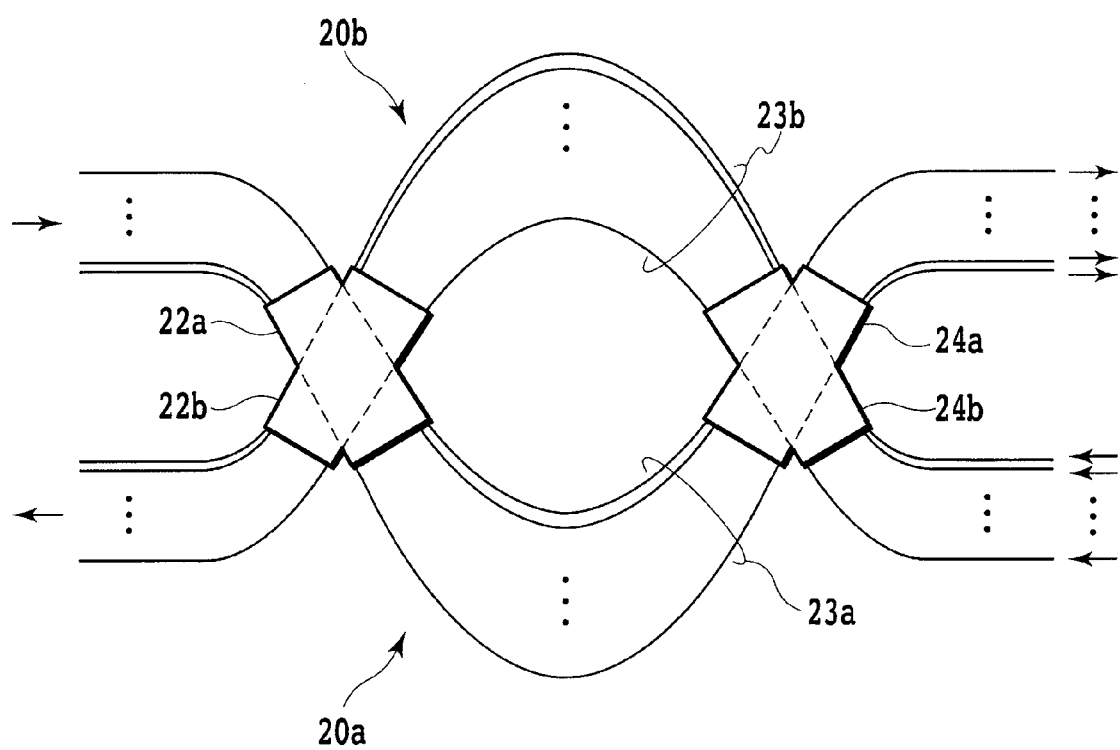
FIG. 2 illustrates the structure of a multiplexer/demultiplexer using the conventional AWG circuit.
Figure 3:
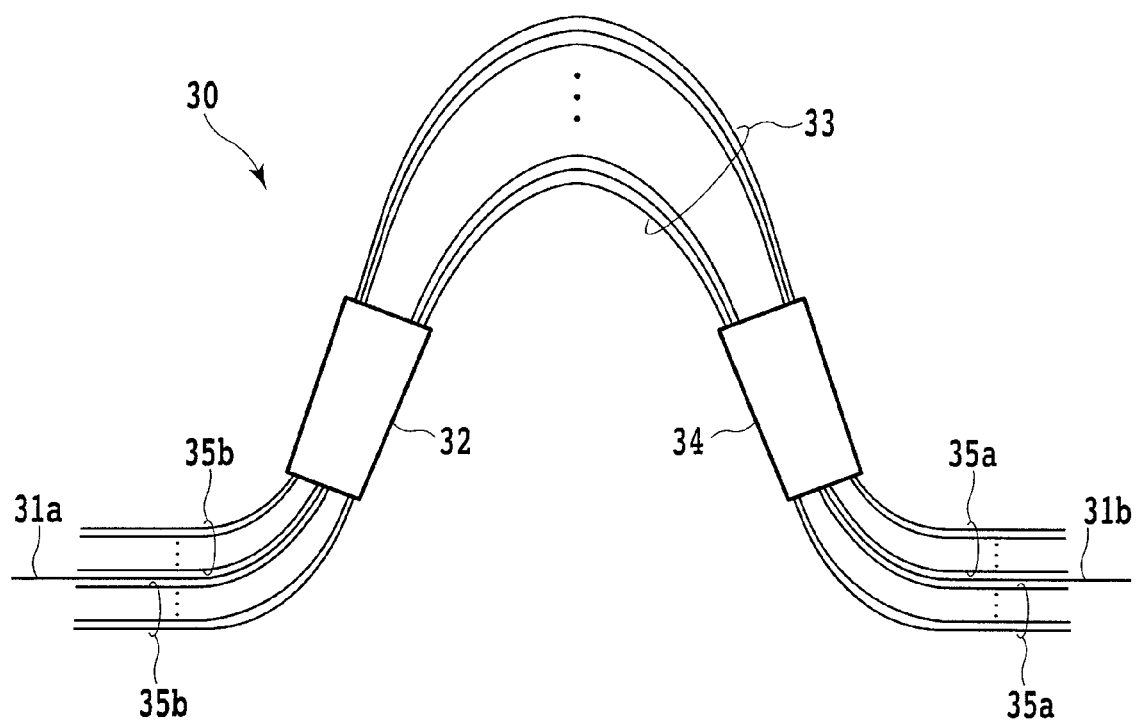
FIG. 3 illustrates the structure of the conventional AWG circuit sharing an array waveguide.
Figure 4:
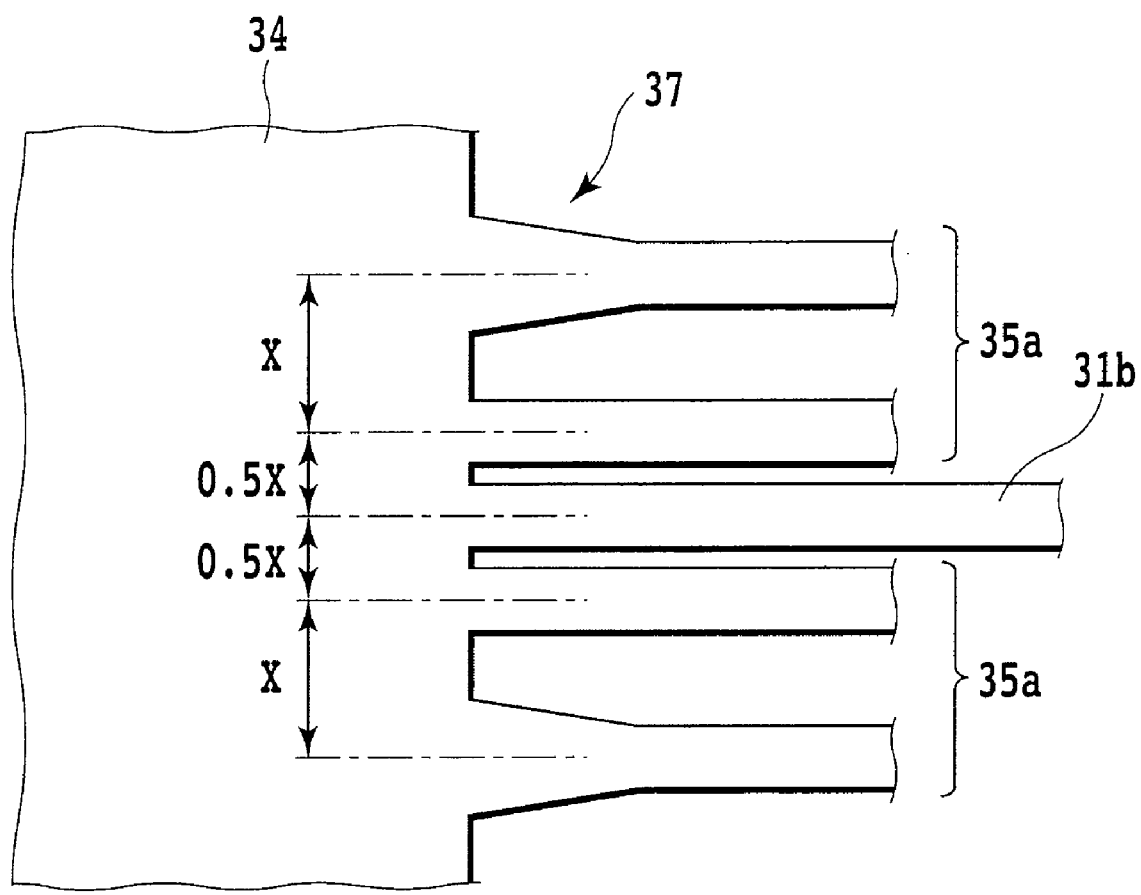
FIG. 4 shows the conventional relation according to which the input/output waveguide is connected to the slab waveguide.
Figure 5:
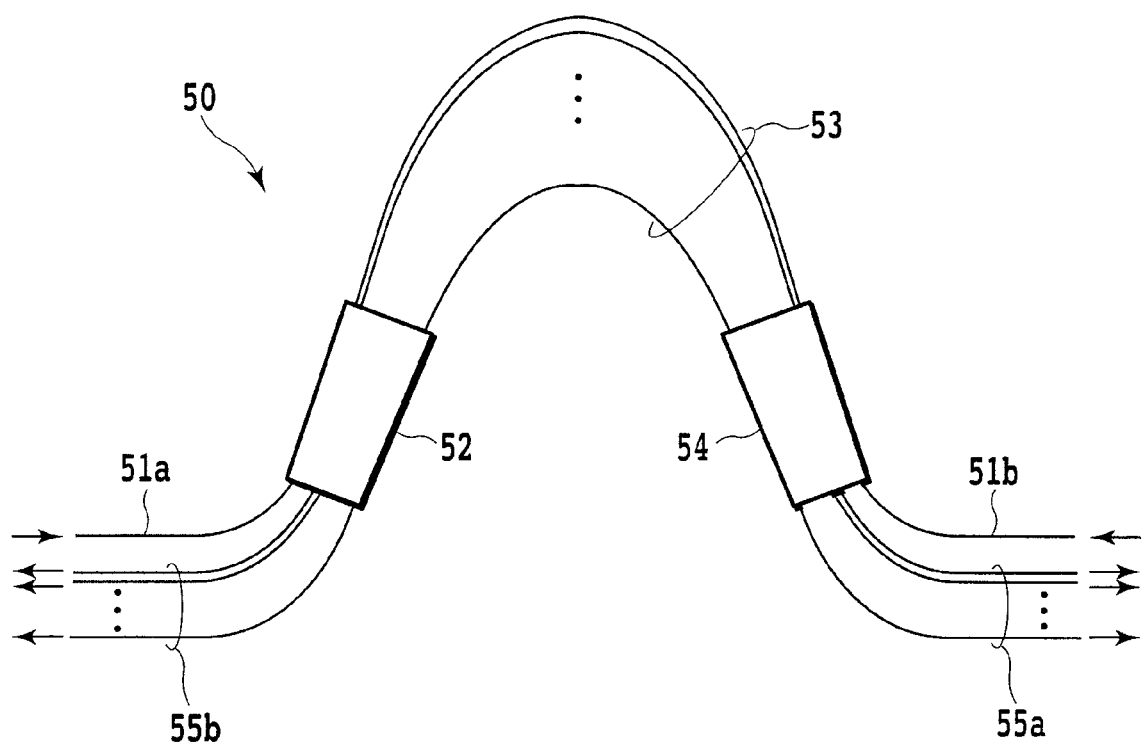
FIG. 5 illustrates the structure of the AWG circuit according to one embodiment of the present invention.

The following section will describe an embodiment of the present invention with reference to the drawings. FIG. 5 illustrates the structure of the AWG circuit according to one embodiment of the present invention. The AWG circuit 50 is composed of: the first slab waveguide 52 connected to an input waveguide 51a and output waveguides 55b; the second slab waveguide 54 connected to output waveguides 55a and an input waveguide 51b; and an array waveguide 53 connecting the first slab waveguide 52 to the second slab waveguide 54. In this embodiment, one input waveguide is positioned at the outer side of a column of a series of output waveguides. In FIG. 5, the input waveguide 51a is connected to the first slab waveguide 52 at the upper side and the output waveguides 55b are at the lower side. An opposite layout is also possible where the output waveguides 55b are connected to the first slab waveguide 52 at the upper side and the input waveguide 51a is at the lower side.

Figure 6:
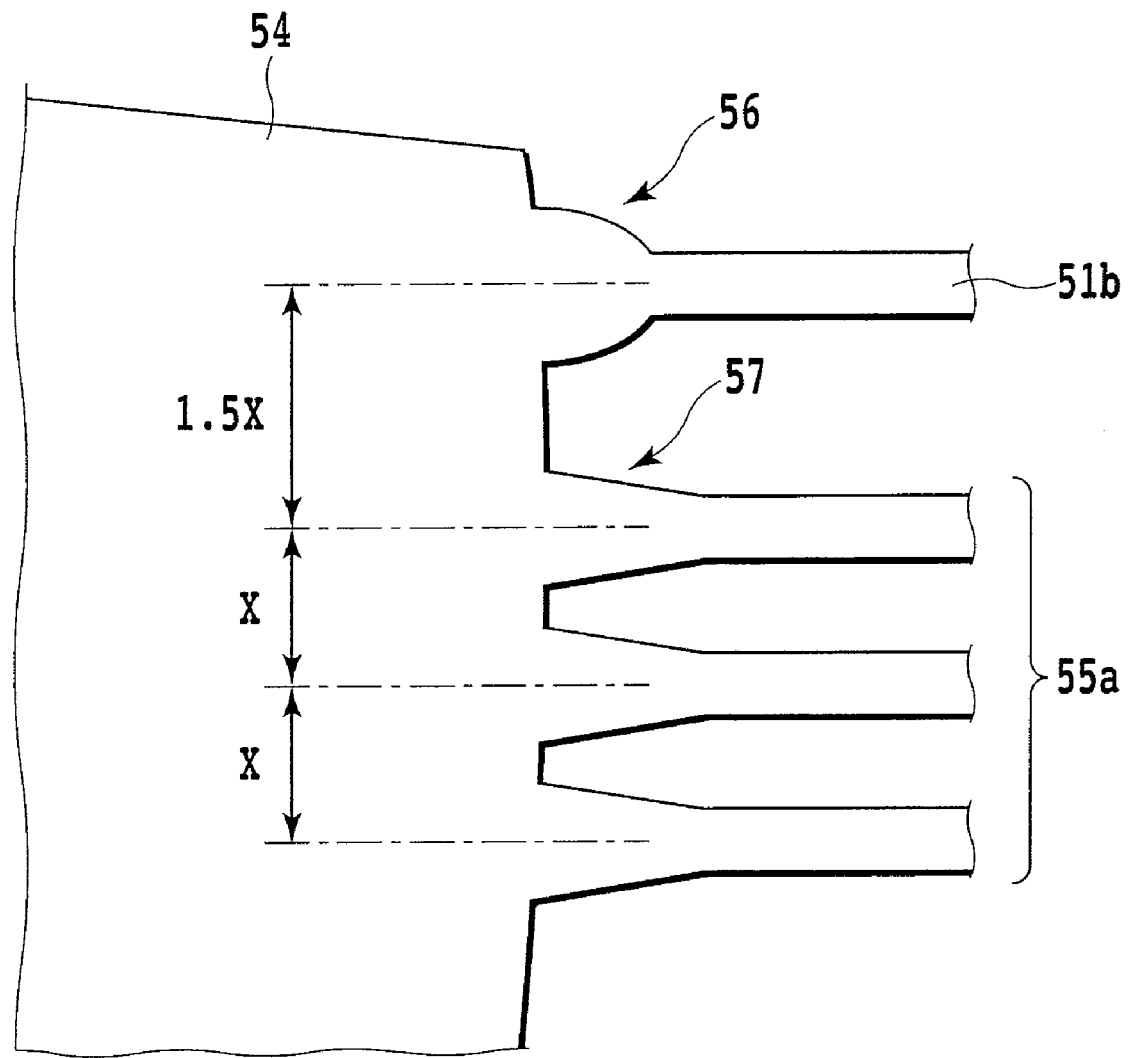
FIG. 6 shows a connection relation according to which the input/output waveguide is connected to the slab waveguide.

FIG. 6 shows a connection relation according to which the input/output waveguide is connected to the slab waveguide. An optical signal emitted from the array waveguide 53 concentrates at a different position depending on the each wavelength due to the angular dispersion caused by the phase difference given by the array waveguide. By connecting the output waveguides 55a to this position, the optical signal having a different wavelength can be outputted from the output waveguides 55a different depending on the wavelength. Thus, the output waveguides 55a are connected to the second slab waveguide 54 with the predetermined interval x in accordance with the wavelength interval.

By the structure as described above, the connecting part at which the input/output waveguide is connected to the slab waveguide can be structured so that the input waveguide has a parabolic connecting section 56 and the output waveguide has a tapered connecting section 57. Thus, the connecting part at which the input/output waveguide is connected to the slab waveguide can have a transmission bandwidth having an increased spectrum without causing the crosstalk between the input waveguide and the neighboring output waveguide.

The AWG circuit of this embodiment may be used so that the optical signal inputted through the input waveguides 51a and 51b penetrates the array waveguide 53 in an opposed manner as two different demultiplexers, or also may be used as two multiplexers different in opposite directions. Alternatively, the input waveguide 51a and the output waveguides 55a also may be used for a demultiplexer and the input waveguide 51b and the output waveguides 55b also may be used for a multiplexer.

The input waveguide 51b is provided at the outer side of the output waveguides 55a arranged with the predetermined interval x. The input waveguide 51b is positioned so that the optical signal emitted from the input waveguide 51b is diffracted by the second slab waveguide 54 to expand to enter the array waveguide. The input waveguide 51b is positioned with an interval of 1.5× to the neighboring output waveguide 55a.

The following section will describe a method for arranging the input waveguide 51 with regards to an example in which eight waves (λ1 to λ8) having a uniform wavelength interval are handled.

First, a case will be described where the input waveguide 51a is positioned with the interval x to the neighboring output waveguide 55b and the input waveguide 51b is positioned with the interval x to the neighboring output waveguide 55a. When the wavelength multiplexing optical signals for which the optical signals having wavelengths λ1 to λ8 are multiplexed are inputted to the input waveguide 51a, the optical signals having wavelengths λ1 to λ8 are outputted to the output waveguides 55a-1 to 55a-8, respectively. Here, considering that an optical signal having a wavelength λ0 is separated with an interval equal to the wavelength interval of the wavelength multiplexing optical signal (i.e., a mistakenly inputted signal). The optical signal of the wavelength λ0 inputted to the input waveguide 51a is undesirably outputted to the input waveguide 51b. Accordingly, a disadvantage is caused where the optical signal is outputted through the waveguide to which the optical signal should be inputted.

In the case of the AWG circuit using the cyclic wavelength, the product of the number of channels with the wavelength interval corresponds to the free spectrum region (FSR) of the AWG. When the wavelength multiplexing optical signals for which the optical signals having the wavelengths λ1 to λ8 are multiplexed are inputted to the input waveguide 51a, the optical signals having the wavelengths λ1 to λ8 are outputted to the output waveguides 55a-1 to 55a-8. Simultaneously with this, the optical signal of the wavelength λ8 is undesirably outputted to the input waveguide 51b. The optical signal outputted to the input waveguide 51b is the one of light having a different order from that of the optical signal outputted from the output waveguide 55a-8. As described above, the AWG circuit using the cyclic wavelength also has the above disadvantage where the optical signal is outputted through the waveguide to which the optical signal should be inputted.

When the output waveguide of the AWG circuit is connected with a connector terminal to which nothing is connected for example, return light due to Fresnel reflection is caused. As described above, the optical signal of wavelength λ1 is demultiplexed to the output waveguide 55a-1. However, a small crosstalk causes the optical signals of the wavelengths λ2 to λ8 to be also demultiplexed to the output waveguide 55a-1. The optical signals of the wavelengths λ1 to λ8 demultiplexed to the output waveguide 55a-1 are reflected at the end surface of the connector terminal and are inputted again to the AWG circuit. This reflected return light is outputted from the output waveguides 55b-1 to 55b-8. Accordingly, a disadvantage is caused where the optical signal is outputted from the output waveguides 55b in spite of the fact that no optical signal is inputted to the input waveguide 51b.

The input waveguide 51 is arranged at the outer side of the output waveguide 55 with an interval different from the predetermined interval x depending on the wavelength interval. This arrangement prevents, even when the optical signal of the wavelength λ0 is inputted to the input waveguide 51a, the signal from being outputted to the input waveguide 51b. Even in the case of the AWG circuit using the cyclic wavelength, the optical signal of the wavelength λ8 is prevented from being outputted to the input waveguide 51b. Furthermore, the reflected return light can be prevented from being outputted from the output waveguide 55.

By arranging the input waveguide 51 with the interval of 1.5× to the neighboring output waveguide 55, the mistakenly inputted signal for example reaches between the input waveguide and the output waveguide or between neighboring output waveguides, thus minimizing the influence.

Figure 7:
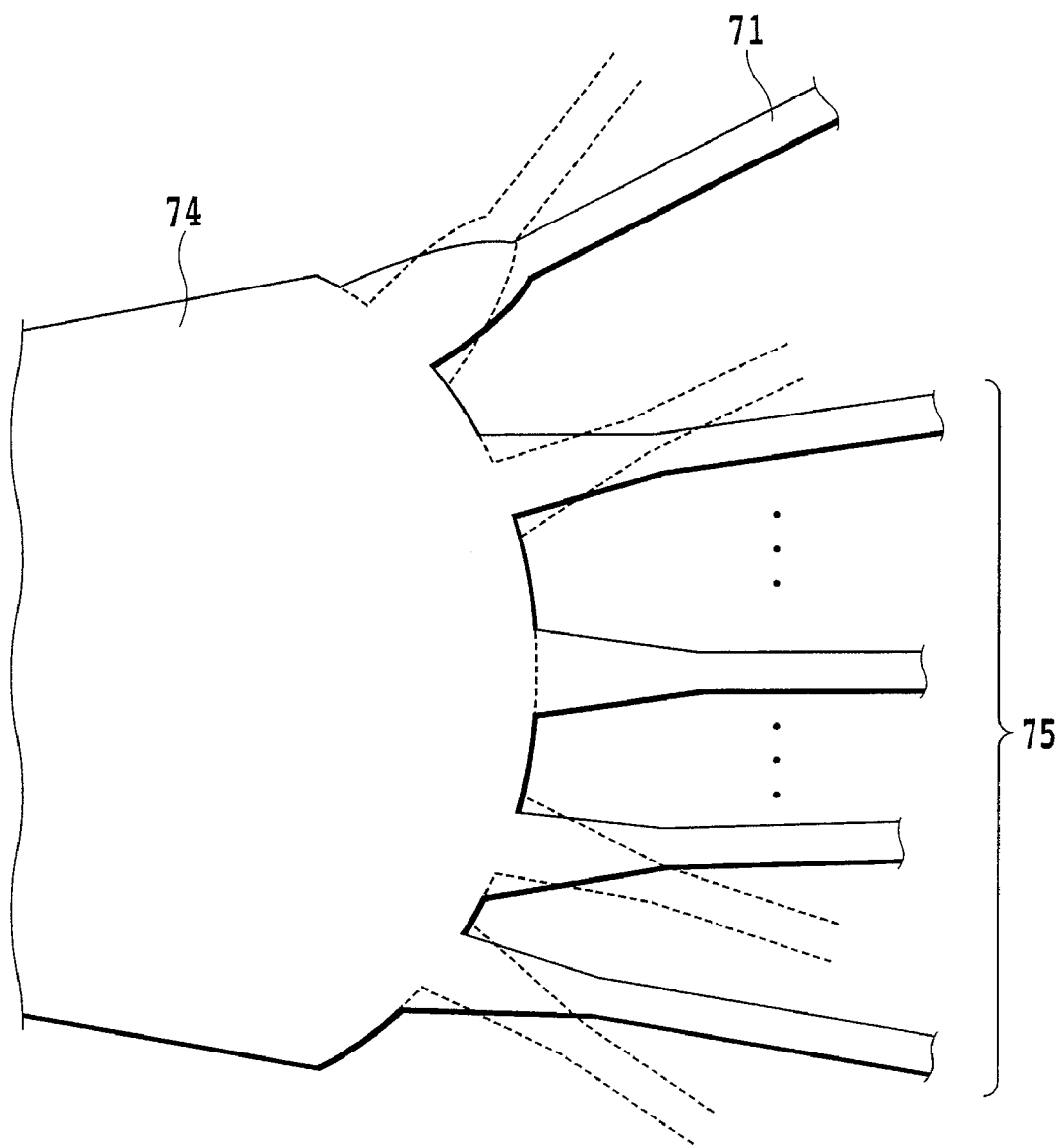
FIG. 7 shows a connection relation according to which the input/output waveguide is connected to the slab waveguide.

Next, the following section will describe the structure of the connecting part at which the input/output waveguide is connected to the slab waveguide. Although not shown in FIGS. 5 and 6 for simplicity, one side of the slab waveguide to which the input waveguide and the output waveguide are connected draws a circular arc. Thus, the input/output waveguide is vertically attached to the tangent line of the one side of the slab waveguide. FIG. 7 shows another method for connecting the input/output waveguide to the slab waveguide. The output waveguide at the center of the output waveguide 75 is vertically connected to the tangent line but is inclined to the inner side toward the outer side. The input waveguide 71 is provided with the interval of 1.5× to the neighboring output waveguide 75 and is similarly attached so as to be inclined to the inner side as in the output waveguide 75. The inclined input/output waveguide as described above can reduce the inclination of the waveform of the optical signal propagating in the slab waveguide 74.

Figure 8:
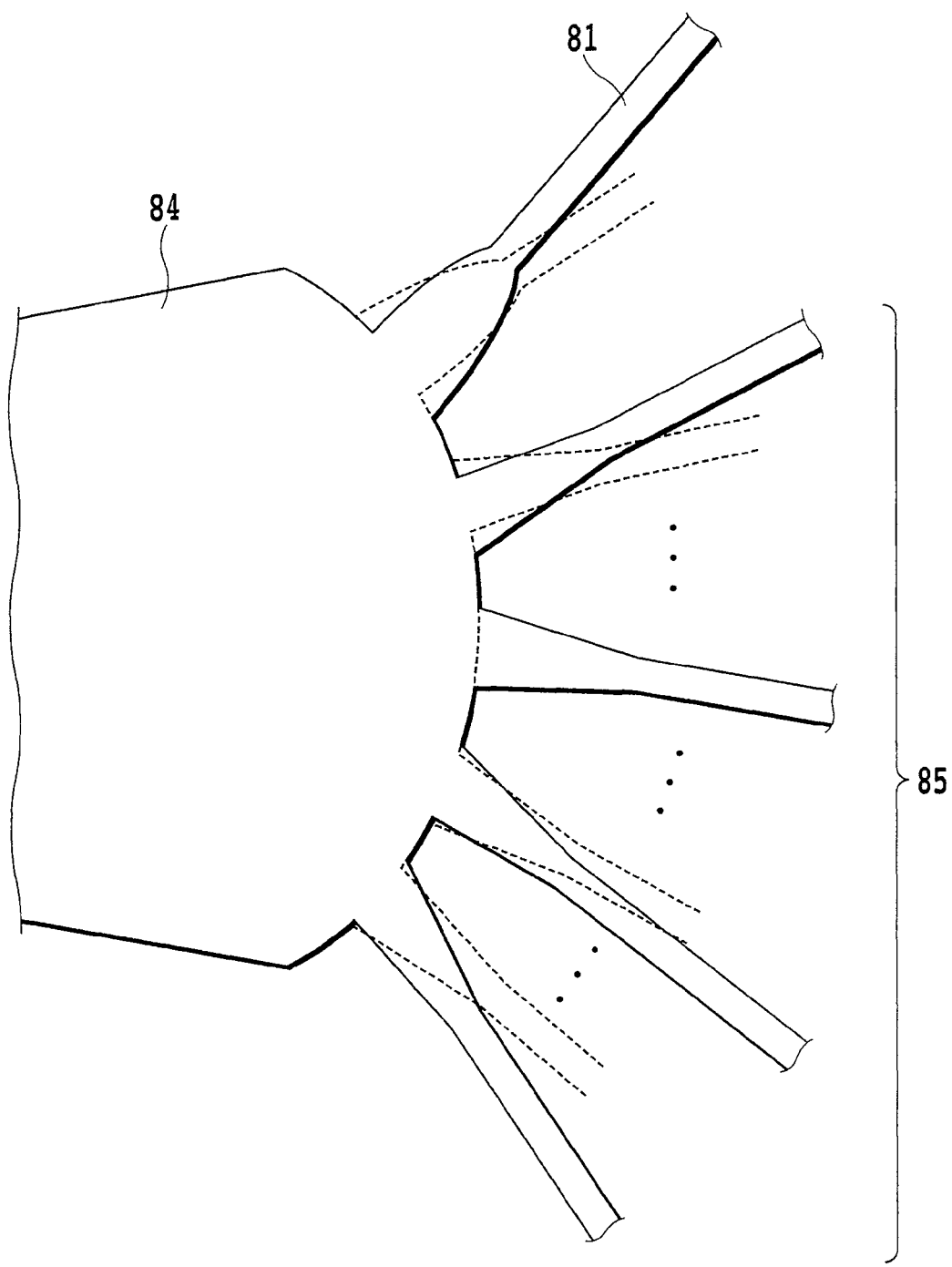
FIG. 8 shows a connection relation according to which the input/output waveguide is connected to the slab waveguide.

As shown in FIG. 8, the output waveguide at the center of the output waveguides 85 also may be vertically attached to the tangent line and the output waveguide is inclined to the outer side toward the outer side. The input waveguide 81 is attached with the interval of 1.5× to the neighboring output waveguide 85 and is inclined to the outer side as in the output waveguide 85.

According to this embodiment, the input waveguide is arranged to the neighboring output waveguide with an interval 1.5 times higher than the predetermined interval x depending on the wavelength. Thus, the two AWG circuits can be integrated while preventing the deteriorated quality in the multiplexing/demultiplexing function. An interval between the input waveguide and the neighboring output waveguide also may be obtained by adding x/2 to the positive integer multiple of the predetermined interval x.

The invention claimed is:

1. An arrayed waveguide grating circuit, comprising:
   a first slab waveguide connected to a first input waveguide and second output waveguides at one face;
   a second slab waveguide connected to first output waveguides and a second input waveguide at one face; and
   an array waveguide that connects the other face opposed to the one face of the first slab waveguide to the other face opposed to the one face of the second slab waveguide,
   wherein the first input waveguide is connected to the first slab waveguide and is positioned outside of the second output waveguides with a second interval to an outermost second output waveguide among the second output waveguides connected to the one face of the first slab waveguide with a first interval depending on a wavelength, the second interval differing from the first interval, and
   wherein the second input waveguide is connected to the second slab waveguide and is positioned outside of the first output waveguides with a fourth interval to an outermost first output waveguide among the first output waveguides connected to the one face of the second slab waveguide with a third interval depending on a wavelength the fourth interval differing from the third interval.

2. The arrayed waveguide grating circuit according to claim 1, wherein the second interval is an interval obtained by adding a half of the first interval to a positive integer multiple of the first interval.

3. The arrayed waveguide grating circuit according to claim 1, wherein the second interval is an interval 1.5 times higher than the first interval.

4. The arrayed waveguide grating circuit according to claim 1, wherein the fourth interval is an interval obtained by adding a half of the third interval to a positive integer multiple of the third interval.

5. The arrayed waveguide grating circuit according to claim 1, wherein the fourth interval is an interval 1.5 times higher than the third interval.

6. The arrayed waveguide grating circuit according to claim 1, wherein the values of the first and third intervals are equal and the values of the second and fourth intervals are equal.

7. An arrayed waveguide grating circuit, comprising:
   a first slab waveguide having a first face and an opposing second face, the first slab waveguide connected to a first input waveguide and second output waveguides at the first face;
   a second slab waveguide having a first face and an opposing second face, the second slab waveguide connected to first output waveguides and a second input waveguide at the first face; and
   an array waveguide that connects the second face of the first slab waveguide to the second face of the second slab waveguide,
   wherein the second output waveguides are separated from each other at the first face of the first slab waveguide by a first interval depending on wavelength, and the first input waveguide is positioned outside of the second output waveguides, the first input waveguide being separated from an outermost waveguide of the second output waveguides at the first face of the first slab waveguide by a second interval that differs from the first interval, and
   wherein the first output waveguides are separated from each other at the first face of the second slab waveguide by a third interval depending on wavelength, and the second input waveguide is positioned outside of the first output waveguides, the second input waveguide being separated from an outermost waveguide of the first output waveguides at the first face of the second slab waveguide by a fourth interval that differs from the third interval.

8. The arrayed waveguide grating circuit according to claim 7, wherein the second interval is determined by adding a half of the first interval to a positive integer multiple of the first interval.

9. The arrayed waveguide grating circuit according to claim 7, wherein the second interval is 1.5 times greater than the first interval.

10. The arrayed waveguide grating circuit according to claim 7, wherein the fourth interval is determined by adding a half of the third interval to a positive integer multiple of the third interval.

11. The arrayed waveguide grating circuit according to claim 7, wherein the fourth interval is 1.5 times higher than the third interval.

12. The arrayed waveguide grating circuit according to claim 7, wherein the values of the first and third intervals are equal and the values of the second and fourth intervals are equal.

* * * * *